United States Patent
Youm

(10) Patent No.: US 11,033,815 B2
(45) Date of Patent: Jun. 15, 2021

(54) METHOD FOR PLAYING MULTIPLAYER-NETWORK GAME PERFORMED BY USER DEVICE AND USER DEVICE

(71) Applicant: XOGAMES INC., Seongnam-si (KR)

(72) Inventor: Eui-Joon Youm, Seongnam-si (KR)

(73) Assignee: XOGAMES INC., Seongnam-si (KR)

( * ) Notice: Subject to any disclaimer, the term of this patent is extended or adjusted under 35 U.S.C. 154(b) by 0 days.

(21) Appl. No.: 16/196,085

(22) Filed: Nov. 20, 2018

(65) Prior Publication Data

US 2019/0083884 A1 Mar. 21, 2019

Related U.S. Application Data

(63) Continuation of application No. PCT/KR2017/005292, filed on May 22, 2017.

(30) Foreign Application Priority Data

May 20, 2016 (KR) .................... 10-2016-0062020

(51) Int. Cl.
| | |
|---|---|
| *A63F 13/358* | (2014.01) |
| *A63F 13/497* | (2014.01) |
| *A63F 13/355* | (2014.01) |
| *A63F 13/332* | (2014.01) |
| *A63F 13/34* | (2014.01) |

(52) U.S. Cl.
CPC .......... *A63F 13/358* (2014.09); *A63F 13/355* (2014.09); *A63F 13/497* (2014.09); *A63F 13/332* (2014.09); *A63F 13/34* (2014.09); *A63F 2300/5533* (2013.01)

(58) Field of Classification Search
None
See application file for complete search history.

(56) References Cited

U.S. PATENT DOCUMENTS

| | | | | |
|---|---|---|---|---|
| 5,354,202 | A * | 10/1994 | Moncrief | ................ A63F 13/10 |
| | | | | 434/69 |
| 6,095,920 | A * | 8/2000 | Sadahiro | ................ A63F 13/10 |
| | | | | 463/2 |
| 6,371,848 | B1 * | 4/2002 | Ashby | ................ A63F 3/00072 |
| | | | | 273/256 |
| 7,584,228 | B1 * | 9/2009 | Protassov | ........... G06F 16/1748 |

(Continued)

FOREIGN PATENT DOCUMENTS

| | | |
|---|---|---|
| JP | 2005087418 | 4/2005 |
| JP | 2010269039 | 12/2010 |

(Continued)

OTHER PUBLICATIONS

International Search Report—PCT/KR2017/005292 dated Aug. 25, 2017.

*Primary Examiner* — Seng H Lim
(74) *Attorney, Agent, or Firm* — Cantor Colburn LLP

(57) ABSTRACT

A method for playing a multiplayer-network game performed by a user device comprises receiving information about at least one past play of at least one first user device from a game providing server, connecting the user device with at least one second user device, and playing a game between the user device and the at least one second user device in a state of synchronization with the at least one past play of the at least one first user device.

11 Claims, 5 Drawing Sheets

(56) References Cited

U.S. PATENT DOCUMENTS

| | | | |
|---|---|---|---|
| 8,103,700 B2* | 1/2012 | Yabuki | A63F 13/12 707/803 |
| 8,527,553 B2* | 9/2013 | Yabuki | A63F 13/12 707/803 |
| 9,168,459 B1* | 10/2015 | DeLaet | A63F 13/80 |
| 2007/0060359 A1* | 3/2007 | Smith | A63F 13/327 463/42 |
| 2007/0293290 A1* | 12/2007 | McNally | G07F 17/32 463/7 |
| 2008/0009352 A1* | 1/2008 | Aoyama | A63F 13/358 463/43 |
| 2008/0167121 A1* | 7/2008 | Maeda | A63F 13/12 463/30 |
| 2010/0160038 A1* | 6/2010 | Youm | A63F 13/10 463/29 |
| 2011/0190063 A1* | 8/2011 | Kajii | A63F 13/52 463/42 |
| 2012/0009997 A1* | 1/2012 | Youm | A63F 13/497 463/42 |
| 2012/0010734 A1* | 1/2012 | Youm | A63F 13/67 700/92 |
| 2012/0021823 A1* | 1/2012 | Youm | A63F 13/497 463/29 |
| 2012/0064968 A1* | 3/2012 | Youm | A63F 13/335 463/29 |
| 2012/0122552 A1* | 5/2012 | Youm | A63F 13/77 463/23 |
| 2012/0295718 A1* | 11/2012 | Paquet | A63F 13/86 463/43 |
| 2013/0182186 A1* | 7/2013 | Ikenaga | A63F 13/355 348/723 |
| 2013/0190094 A1* | 7/2013 | Ronen | A63F 13/12 463/42 |
| 2015/0336006 A1* | 11/2015 | Motokura | A63F 13/77 463/43 |
| 2018/0250595 A1* | 9/2018 | Kurabayashi | A63F 13/35 |

FOREIGN PATENT DOCUMENTS

| | | |
|---|---|---|
| JP | 2014073266 | 4/2014 |
| KR | 20090030636 | 3/2009 |
| KR | 20130134172 | 12/2013 |
| KR | 101450469 | 11/2014 |

* cited by examiner

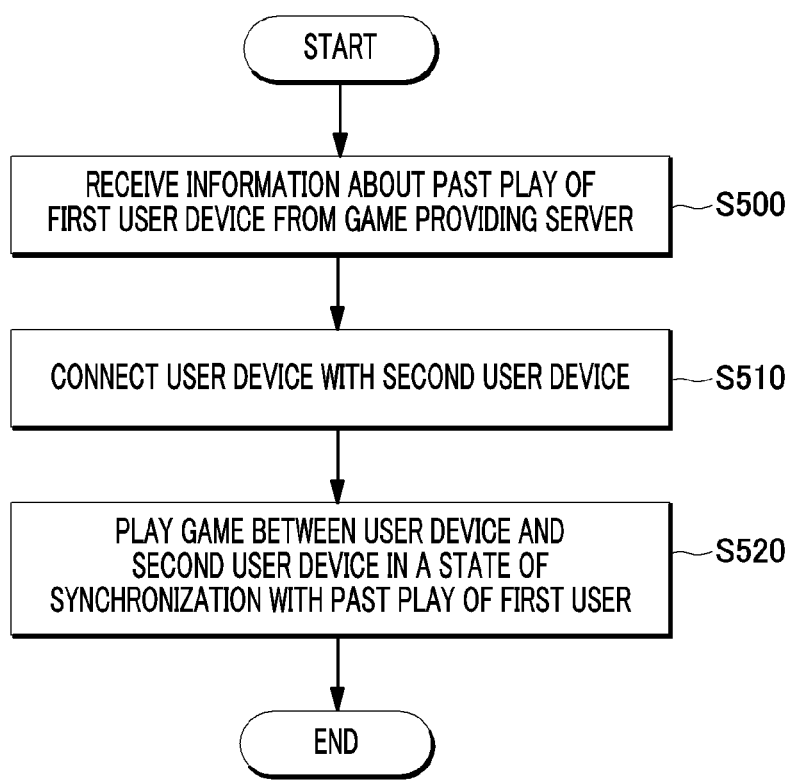

METHOD FOR PLAYING MULTIPLAYER-NETWORK GAME PERFORMED BY USER DEVICE AND USER DEVICE

TECHNICAL FIELD

The present disclosure relates to a method for playing a multiplayer-network game performed by a user device and a user device.

BACKGROUND

Most of conventional games have been developed and distributed based on PC-based OS such as Windows, and users have played the games on a desktop PC with Windows OS. In this desktop environment, the device is not changed in position and a wired network is used. Therefore, in many cases, the users can easily access the games.

Recently, with the rapid development of the mobile device market, the mobile game market has also rapidly grown. In the early 2000s, the development of mobile games was limited due to the overall poor performance of mobile devices and high communication costs. However, with the spread of mobile devices, the number of users has been greatly increased, and with the improvement in performance of mobile devices, a lot of excellent games have been developed.

A mobile game is advantageous in that it can be used with a large number of users regardless of place. However, in a mobile environment, network access is unstable when a user is on the move or plays the mobile game in a populated area.

Due to this problem, many of mobile games are single player games. Multiplayer games also have many technological limitations.

In this regard, Korean Patent Laid-open Publication No. 2009-0030636 discloses a game service system and its method using a mobile communication device.

SUMMARY

In view of the foregoing, the present disclosure provides a method and device for playing a multiplayer-network game even in a mobile environment in which network access is unstable. The present disclosure provides a method including receiving information about at least one past play of at least one first user device from a game providing server, connecting a user device with at least one second user device, and playing a game between the user device the at least one second user device in a state of synchronization with the at least one past play of the at least one first user device, and a user device.

Further, the present disclosure provides a method and device for stably providing a multiplayer-network game even in a mobile environment in which network access is unstable by providing the game through unified synchronous and asynchronous communication.

However, problems to be solved by the present disclosure are not limited to the above-described problems. There may be other problems to be solved by the present disclosure.

According to an aspect of the present disclosure, a method for playing a multiplayer-network game performed by a user device, comprises receiving information about at least one past play of at least one first user device from a game providing server, connecting the user device with at least one second user device and playing a game between the user device and the at least one second user device in a state of synchronization with the at least one past play of the at least one first user device.

According to another aspect of the present disclosure, a user device that plays a multiplayer-network game, comprises a game information receiving unit configured to receive information about at least one past play of at least one first user device from a game providing server, a communication unit configured to connect the user device with at least one second user device, and a game execution unit configured to play a game between the user device and the at least one second user device in a state of synchronization with the at least one past play of the at least one first user device.

According to the present disclosure, it is possible to provide a method including receiving information about at least one past play of at least one first user device from a game providing server, connecting a user device with at least one second user device, and playing a game between the user device and the at least one second user device in state of synchronization with the at least one past play of the at least one first user device, and a user device.

Further, it is possible to provide a method and device for stably providing a multiplayer-network game even in a mobile environment in which network access is unstable by providing the game through unified synchronous and asynchronous communication.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 5 is a flowchart showing a method for providing a multiplayer-network game in accordance with various embodiments described herein.

DETAILED DESCRIPTION

Figure 1:
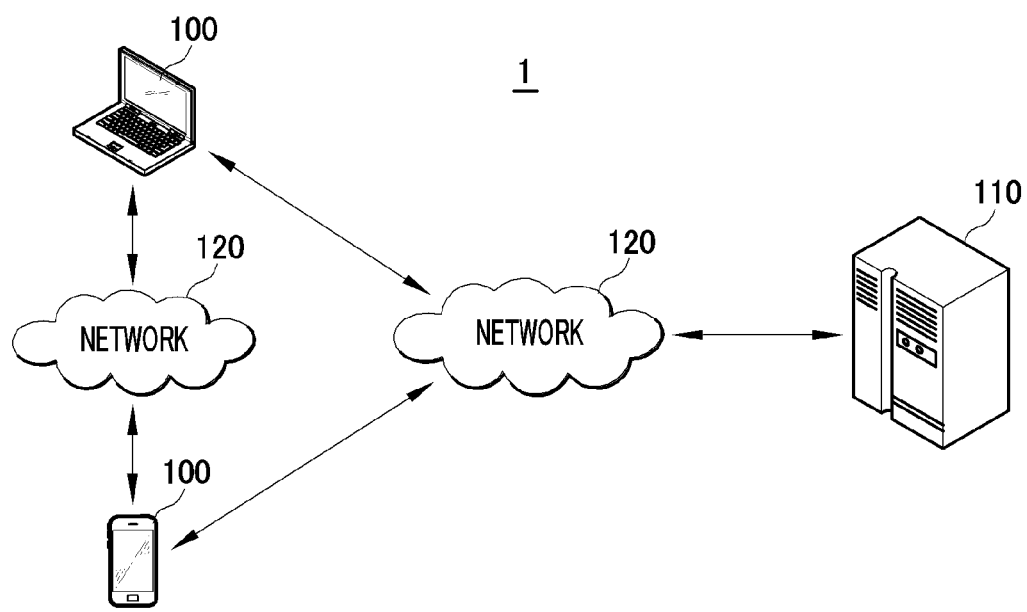
FIG. 1 is a configuration view illustrating a multiplayer-network game providing system in accordance with various embodiments described herein.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to"

another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware.

Through the whole document, a part of an operation or function described as being carried out by a terminal or device may be carried out by a server connected to the terminal or device. Likewise, a part of an operation or function described as being carried out by a server may be carried out by a terminal or device connected to the server.

Hereinafter, an exemplary embodiment of the present disclosure will be described in detail with reference to the accompanying configuration views or process flowcharts.

FIG. 1 is a configuration view illustrating a multiplayer-network game providing system in accordance with an embodiment of the present disclosure. Referring to FIG. 1, a multiplayer-network game providing system 1 may include multiple user devices 100 and a game providing server 110.

The multiplayer-network game providing system 1 may provide a game through unified synchronous and asynchronous communication. Herein, a game through asynchronous communication refers to a type of game in which if a user device 100 can access the Internet, the user device 100 downloads game information, e.g., information about previous plays (or past plays) of other players, in advance from the game providing server 110 and stores the game information in a local database (or internal memory) and the stored game information can be used to make a user feel like he/she plays a game with other players in real time regardless of whether or not the user device 100 accesses the Internet.

A game through synchronous communication refers to a type of game in which a game is played with other users in real time through wired and wireless communication between the game providing server 110 and one or more user devices 100. Herein, the synchronous communication may include Server-Client communication as a synchronous method through Internet communication with a server and Peer-To-Peer communication as a synchronous method through direct communication between clients.

In the game through synchronous communication, data can be transmitted and received with any player but access is unstable in a mobile environment. Further, in the game through asynchronous communication, the game can be played even when a device does not access the Internet but cannot be played with multiple players and interactions between users are limited a lot. According to an embodiment of the present disclosure, a game is provided through unified synchronous and asynchronous communication, and, thus, it is possible to stably provide a multiplayer-network game even in a mobile environment in which network access is unstable.

The user device 100 may receive information about at least one past play of a first user device from the game providing server 110. Herein, when the user device 100 receives the information about the at least one past play of the first user device, the first user device may not access the game providing server 110. It doesn't matter if the first user device accesses the game providing server 110. The information about the at least one past play may include all information required for game play, such as information about the first user device, multiple pieces of input information, output information corresponding to the input information, game background information, and game play information. For example, the information about the first user device may include the user's nickname, character name, character shape, items possessed by the user, playing time, geographic location, game proficiency, gender, age, and the like. Further, the game background information may include map information and weather information corresponding to the at least one past play of the first user device. Furthermore, the game play information may include the number of players and game options corresponding to the at least one past play of the first user device.

The information about the at least one past play may vary depending on the kind of game. For example, in a sequential game (e.g., golf game), information about at least one past play may be divided into multiple plays in each turn of the first user device. In contrast, in a simultaneous game (e.g., racing game), information about at least one past play may not be divided.

The user device 100 may store the information about the at least one past play of the first user device received from the game providing server 110 in a local database (or internal memory). The user device 100 may play a single player game based on the stored information about the at least one past play of the first user device. In a conventional single player game, the game is played between a user and a computer and the computer manages the game in a predetermined way, which makes it difficult to keep the user interested in the game. According to the present disclosure, unlike the conventional single player game, information about at least one past play of other users are used to make the user feel like he/she plays a multiplayer game.

The user device 100 may be connected with a second user device. Herein, the second user device may be one of the multiple user devices 100. The second user device may be a device of a second user who accesses the game providing server 110. The second user device may include a user device connected through the Server-Client communication and a user device connected through the Peer-To-Peer communication.

For example, a game may be played between the user device 100 and a user device connected with the user device 100 through the Peer-To-Peer communication or between the user device 100 and a user device connected with the user device 100 through the Server-Client communication. Further, a game may be played among the user device 100, a user device connected with the user device 100 through the Server-Client communication, and a user device connected with the user device 100 through the Peer-To-Peer communication or among the user device 100 and multiple second user devices connected with the user device 100 through the Server-Client communication or Peer-To-Peer communication.

The user device 100 may be connected with the second user device based on basic conditions. Herein, the basic conditions may include a distance, application availability, a communication quality, the kind of the second user device, and the like.

For example, if the user device 100 and the second user device satisfy a first condition, the user device 100 may be connected with the second user device through the Server-Client communication, and if the user device 100 and the second user device satisfy a second condition, the user device 100 may be connected with the second user device through the Peer-To-Peer communication. Herein, the Server-Client communication may include wired and wireless Internet and WiFi. Further, the Peer-To-Peer communication may include WiFi Direct, NFC (Near Field Communication), and Bluetooth.

For example, the user device 100 may measure a distance from the second user device. If a distance between the user device 100 and the second user device is equal to or greater than a preset distance (first condition), the user device 100 may be connected with the second user device through the Server-Client communication. If the distance between the user device 100 and the second user device is equal to or smaller than the preset distance (second condition), the user device 100 may be connected with the second user device through the Peer-To-Peer communication.

Further, the user device 100 may determine the application availability in the second user device and then may be connected with the second user device. For example, if the distance between the user device 100 and the second user device is equal to or smaller than the preset distance (the above-described second condition), the user device 100 may automatically determine the application availability in the second user device and may be preferentially connected with the second user device present within the preset distance from the user device 100. Since the user device 100 is automatically connected with the second user device present within the preset distance and plays a game, it can play the game with the nearby the second user device with a sense of realism.

Furthermore, the user device 100 may measure a communication quality of the user device 100. If a communication quality of the user device 100 is equal to or greater than a preset value (first condition), the user device 100 may be connected with the second user device through the Server-Client communication. If the communication quality of the user device 100 is equal to or smaller than the preset value (second condition), the user device 100 may be connected with the second user device through the Peer-To-Peer communication.

Moreover, the user device 100 may determine the kind of the second user device. For example, the user device 100 may receive the kind of the second user device from the game providing server 110. If the second user device is a desktop computer (first condition), the user device 100 may be connected with the second user device through the Server-Client communication. If the second user device is a mobile device (second condition), the user device 100 may be connected with the second user device through the Peer-To-Peer communication.

Further, the user device 100 may be connected with the second user device based on additional conditions. Herein, the additional conditions may include proficiency (e.g., level), preferred gender, or presence or absence of registration as a friend.

For example, if the user of the user device 100 does not select a specific second user device for connection with a second user device, the user device 100 may select at least one second user device based on the additional conditions and may be connected with the selected second user device.

For example, the user device 100 may select a second user device of which a user has a similar proficiency to the user based on proficiency and may be connected with the selected second user device. Further, the user device 100 may preferentially select a second user device of which a user is of the user's preferred gender or registered as a friend based on the user's preferred gender or the presence or absence of registration as a friend and may be connected with the selected second user device.

For example, the user device 100 may be connected with the second user device based on information about a social network platform. For example, the user device 100 may monitor whether or not a social network acquaintance of the user of the user device 100 accesses a game. Further, the user device 100 may be preferentially connected with a device of the social network acquaintance who accesses the game.

For example, the user device 100 may be connected with the second user device with common interests. For example, the common interests may include gender, nationality, age, and job. These common interests may be obtained through the social network platform of the user device 100 or by asking the user device 100 about interests and receiving input from the user device 100.

All or at least one of the above-described basic conditions and additional conditions to be considered in connecting the user device 100 with the second user device may be considered according to various sequences.

The user device 100 may determine the number of second user devices or the ratio of the number of first user devices to the number of second user devices. The user device 100 may measure a communication quality of the user device 100 and then determine the number of second user devices or the ratio of the number of first user devices to the number of second user devices based on the measured communication quality. For example, if the communication quality of the user device 100 is equal to or smaller than a preset value (e.g., poor communication quality), the user device 100 may increase the number of first user devices and decrease the number of second user devices. If the communication quality of the user device 100 is equal to or greater than the preset value (e.g., good communication quality), the user device 100 may decrease the number of first user devices and increase the number of second user devices.

For example, the communication quality may be a Received Signal Strength Indicator (RSSI) or Energy per Chip over the Interface noise (Ec/Io). For another example, if the user device 100 is connected with the Internet or WiFi, it may be determined that the communication quality is equal to or greater than the preset value, and if the user device 100 is connected with a wireless network, it may be determined that the communication quality is equal to or smaller than the preset value.

The user device 100 may determine the kind of the user device 100 and then determine the number of second user devices or the ratio of the number of first user devices to the number of second user devices based on the kind of the user device 100. For example, if the user device 100 is of first kind (e.g., a smart phone), the user device 100 may increase the number of first user devices and decrease the number of second user devices. If the user device 100 is of second kind (e.g., a tablet PC or a desktop computer), the user device 100 may decrease the number of first user devices and increase the number of second user devices.

If the user device 100 is connected with the second user device through the Peer-To-Peer communication, the user device 100 may transmit information about at least one past play of the first user device to the second user device. Since the information about the at least one past play of the first user device is transmitted to the second user device, even when the user device 100 or the second user device does not access the Internet, the information about the at least one past play of the first user device can be shared with the second user device. Thus, it is possible to provide an effect of making the first user device appear as if the first user device accesses the game.

For example, even in an environment in which Internet access is not available (e.g., inside an airplane), at least one past play (latest information) of the first user device stored in a local storage of the user device 100 or the second user device can be shared. Thus, it is possible to provide an effect like accessing data stored in the game server. Therefore, all users connected with one another through the Peer-To-Peer communication can share latest information even when Internet access is not available. Thus, all the users can enjoy the game as if they access the Internet.

Further, if a number of (e.g., several ten, several hundred) users available for the Peer-To-Peer communication are nearby, the at least one past play of the first user device can be interchanged (infinitely interchanged) between the users. Thus, a greater effect can be expected.

The user device 100 may manage a game between the user device 100 and the second user device. The user device 100 may receive a game play method from the user. Herein, the game play method may include at least one of the kind of a game, game rules, map information, weather information, and the number players.

The user device 100 may select information about at least one past play of at least one first user device from among information about past plays of multiple first user devices stored in the local database. The user device 100 may select information about a past play of at least one first user device based on the game play method input by the user. The user device 100 may select information about a past play of a first user device which is identical in at least one of the kind of a game, game rules, map information, weather information, and the number players included in the game play method input by the user. For example, the user device 100 may select information about a past play of a first user device who played a game in a map which is the same as included in the game play method input by the user.

The user device 100 can play the game between the user device 100 and the second user device in a state of synchronization with a past play of a first user device. Herein, the past play of the first user device may be based on the information about the past play of the first user device selected based on the game play method.

The user device 100 may determine the number of first user devices and the number of second user devices based on at least one of the number of second user devices and the ratio of the number of first user devices to the number of second user devices determined based on at least one of a communication quality, the kind of the user device 100, the kind of a second user device, and a distance between the user device 100 and the second user device.

The user device 100 may manage a game for the user device 100 in response to input from the user and a game for the second user device in response to input from the second user device. The user device 100 may synchronize the at least one past play of the first user device with a game to output the at least one past play of the first user device.

For example, in a sequential game (e.g., golf game), information about at least one past play may be divided into multiple plays in each turn of the first user device. In this case, the user device 100 may sequentially manage a game for the user device 100 in response to input from the user in the user's turn, sequentially manage a game for the second user device in response to input from the second user device in a second user's turn, and sequentially output one of the divided multiple plays in a first user's turn.

Further, in a simultaneous game (e.g., racing game), information about at least one past play may not be divided. In this case, a game for the user device 100 may be played in response to input from the user, a game for the second user device may be played in response to input from the second user, and at least one past play of the first user device may be output simultaneously.

Examples of the user device 100 include wireless communication devices that ensure portability and mobility and may include all kinds of handheld-based wireless communication devices such as PCS (Personal Communication System), GSM (Global System for Mobile communications), PDC (Personal Digital Cellular), PHS (Personal Handyphone System), PDA (Personal Digital Assistant), IMT (International Mobile Telecommunication)-2000, CDMA (Code Division Multiple Access)-2000, W-CDMA (W-Code Division Multiple Access), Wibro (Wireless Broadband Internet) device, smartphone, smartpad, tablet PC, and the like.

For example, the user device 100 may be a device with or without a GPS (Global Positioning System) function.

The user device 100 without the GPS function may play a game using GPS information of another nearby device as its GPS information.

For example, the user device 100 without the GPS function may obtain GPS information of another device periodically or in real time.

Herein, the GPS information of another device may be obtained using Bluetooth, WiFi Direct, Internet network bandwidth, and various Near Field Communications.

Otherwise, the user device 100 without the GPS function may obtain GPS information of another device by outputting authentication information such as QR code or URL link from the user device 100 and inputting the authentication information into the other device.

The game providing server 110 may provide information about at least one past play of the first user device to the user device 100.

The game providing server 110 may provide a game between the user device 100 and the second user device.

A network 120 refers to a connection structure that enables information exchange between nodes such as devices and servers. Examples of the network 120 may include Internet, Wireless LAN (Wireless Local Area Network), WAN (Wide Area Network), PAN (Personal Area Network), 3G, LTE (Long Term Evolution), WiFi (Wireless Fidelity), WiMAX (World Interoperability for Microwave Access), WiGig (Wireless Gigabit), WiFi, WiFi Direct, NFC (Near Field Communication), Bluetooth, and the like, but are not limited thereto.

Figure 2:
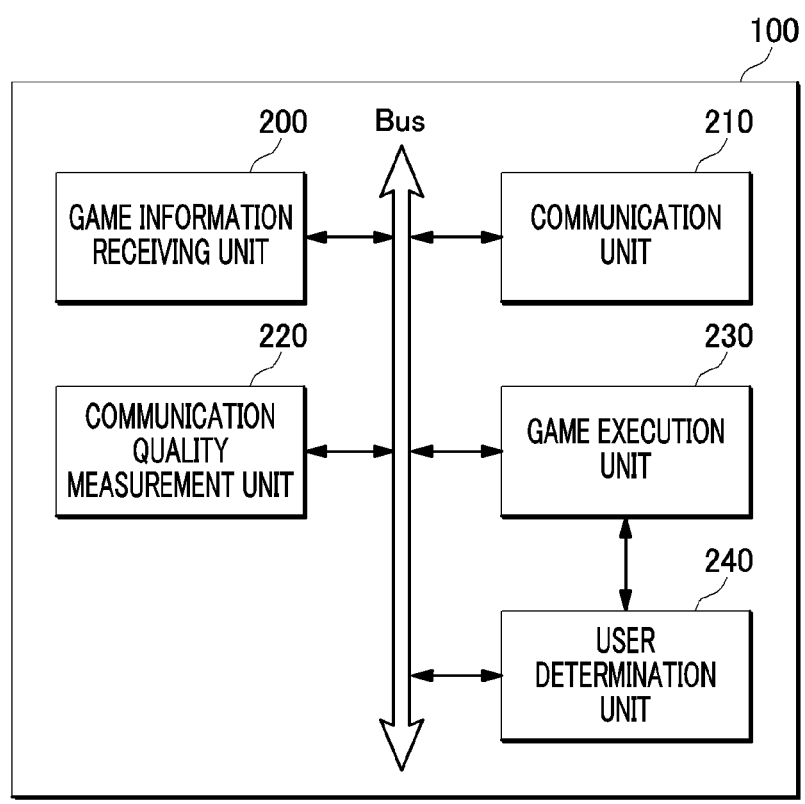
FIG. 2 is a block diagram illustrating a user device in accordance with various embodiments described herein.

FIG. 2 is a block diagram illustrating a user device in accordance with an embodiment of the present disclosure. Referring to FIG. 2, the user device 100 may include a game information receiving unit 200, a communication unit 210, a communication quality measurement unit 220, a game execution unit 230, and a user determination unit 240.

The game information receiving unit 200 may receive information about at least one past play of a first user device from the game providing server 110. Herein, when the user device 100 receives the information about the at least one past play of the first user device, the first user device may not access the game providing server 110. It doesn't matter if the first user device accesses the game providing server 110. The information about the at least one past play may include all information required for game play, such as information about the first user device, multiple pieces of input information, output information corresponding to the input information, game background information, and game play information. For example, the information about the first user device may include the user's nickname, character name, character shape, items possessed by the user, playing time, geographic location, game proficiency, gender, age, and the like. Further, the game background information may include map information and weather information corresponding to the at least one past play of the first user device. Furthermore, the game play information may include the number of players and game options corresponding to the at least one past play of the first user device.

The information about the at least one past play may vary depending on the kind of game. For example, in a sequential game (e.g., golf game), information about at least one past play may be divided into multiple plays in each turn of the first user device. In contrast, in a simultaneous game (e.g., racing game), information about at least one past play may not be divided.

The communication unit 210 may be connected with a second user device. Herein, the second user device may be one of the multiple user devices 100. The second user device may be a device of a second user who accesses the game providing server 110. The second user device may include a user device connected through the Server-Client communication and a user device connected through the Peer-To-Peer communication. For example, a game may be played between the user device 100 and a user device connected with the user device 100 through the Peer-To-Peer communication or between the user device 100 and a user device connected with the user device 100 through the Server-Client communication. Further, a game may be played among the user device 100, a user device connected with the user device 100 through the Server-Client communication, and a user device connected with the user device 100 through the Peer-To-Peer communication or among the user device 100 and multiple second user devices connected with the user device 100 through the Server-Client communication or Peer-To-Peer communication.

If the user device 100 and the second user device satisfy a first condition, the communication unit 210 may connect the user device 100 with the second user device through the Server-Client communication, and if the user device 100 and the second user device satisfy a second condition, the communication unit 210 may connect the user device 100 with the second user device through the Peer-To-Peer communication. Herein, the Server-Client communication may include wired and wireless Internet and WiFi. Further, the Peer-To-Peer communication may include WiFi Direct, NFC (Near Field Communication), and Bluetooth. The first condition and the second condition are the same as described above with reference to FIG. 1. Therefore, explanation thereof will be omitted.

If the communication 210 is connected with the second user device through the Peer-To-Peer communication, the communication unit 210 may transmit the information about the at least one past play of the first user device to the second user device. Since the information about the at least one past play of the first user device is transmitted to the second user device, even when the user device 100 or the second user device does not access the Internet, the information about the at least one past play of the first user device can be shared with the second user device. Thus, it is possible to provide an effect of making the first user device appear as if the first user device accesses the game.

The communication quality measurement unit 220 may measure a communication quality of the user device 100. For example, the communication quality may be a Received Signal Strength Indicator (RSSI) or Energy per Chip over the Interface noise (Ec/Io). For another example, if the user device 100 is connected with the Internet or WiFi, it may be determined that the communication quality is equal to or greater than a preset value, and if the user device 100 is connected with a wireless network, it may be determined that the communication quality is equal to or smaller than the preset value.

The game execution unit 230 may manage a game between second user devices. The game execution unit 230 may include the user determination unit 240. The user determination unit 240 may determine the number of second user devices or the ratio of the number of first user devices to the number of second user devices based on the kind of the user device 100.

Further, the user determination unit 240 may determine the number of second user devices or the ratio of the number of first user devices to the number of second user devices based on the communication quality measured by the communication quality measurement unit 220.

The user determination unit 240 may determine the number of first user devices and the number of second user devices based on at least one of the number of second user devices and the ratio of the number of first user devices to the number of second user devices determined based on at least one of a communication quality, the kind of the user device 100, the kind of the second user device, and a distance between the user device 100 and the second user device.

The game execution unit 230 may further include an input unit (not illustrated) configured to receive a game play method from the user. Herein, the game play method may include at least one of the kind of a game, game rules, map information, weather information, and the number players.

The game execution unit 230 may further include a past play selection unit (not illustrated) configured to select information about at least one past play of at least one first user device from among information about past plays of multiple first user devices stored in the local database. The past play selection unit may select information about at least one past play of at least one first user device based on the game play method input by the user. The past play selection unit may select information about at least one past play of a first user device which is identical in at least one of the kind of a game, game rules, map information, weather information, and the number players included in the game play method input by the user. For example, the past play selection unit may select information about at least one past play of a first user device of which a user played a game in a map which is the same as included in the game play method input by the user.

The game execution unit 230 can play the game between the user device 100 and the second user device in a state of synchronization with at least one past play of a first user device. Herein, the at least one past play of the first user device may be based on the information about the at least one past play of the first user device selected based on the game play method.

The game execution unit 230 may manage a game for the user device 100 in response to input from the user and a game for the second user device in response to input from the second user. The game execution unit 230 may synchronize the at least one past play of the first user device with a game to output the at least one past play of the first user device.

For example, in a sequential game (e.g., golf game), information about at least one past play may be divided into multiple plays in each turn of the first user device. In this case, the user device 100 may manage a game for the user device 100 in response to input from the user in the user's turn, manage a game for the second user device in response to input from the second user in the second user's turn, and output one of the divided multiple plays in the first user's turn.

Further, in a simultaneous game (e.g., racing game), information about at least one past play may not be divided. In this case, a game for the user device 100 may be played in response to input from the user, a game for the second user device may be played in response to input from the second user, and at least one past play of the first user device may be output simultaneously.

Figure 3:
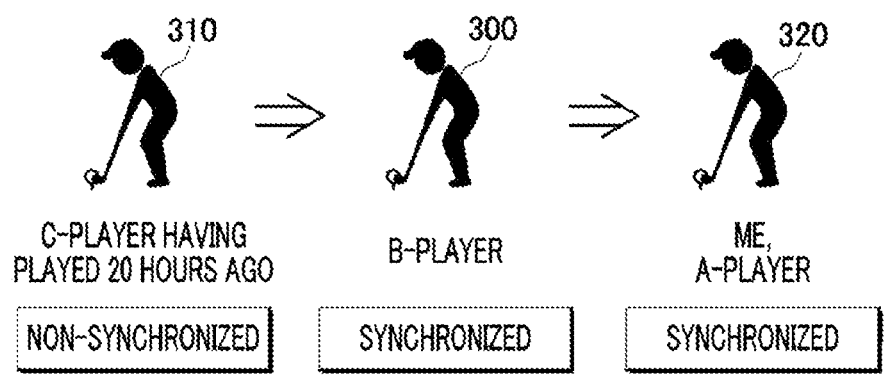
FIG. 3 is a diagram showing an example of a multiplayer-network game in accordance with various embodiments described herein.

FIG. 3 is a diagram showing an example of a multiplayer-network game in accordance with an embodiment of the present disclosure. FIG. 3 illustrates an example of a golf game which is one of sequential games.

The user device 100 may be connected with a user device (one of second user devices) of a B-player 300. The user device 100 may be connected with the user device of the B-player 300 by the same method as described above with reference to FIG. 1 and FIG. 2. The user device 100 may receive a game play method from the user. Herein, the game play method may include at least one of the kind of a game, game rules, map information, weather information, and the number players. For example, the user device 100 may receive a golf course (map), weather, a layout of holes of the golf course, the number of players, and the like.

The user device 100 may select information about at least one past play of a first user device which is identical in a golf course (map), weather, a layout of holes of the golf course, and the number of players input by the user, from among information about at least one past plays of multiple first user devices stored in the local database.

For example, if the user device receives input, i.e., 3 as the number of players, 88 country club as a golf course, and sunny as weather, the user device 100 may select information about at least one past play of a first user device which is identical in 88 country club, sunny weather, and 3 players. Herein, the selected first user device may be a user device of the C-player 310.

The user device 100 may sequentially manage a game. Herein, in a sequential game (e.g., golf game) as shown in FIG. 3, information about at least one past play may be divided into multiple plays in each turn of the first user device. The user device 100 may sequentially manage a game for the user device 100 in response to input from the user 320 in the user 320's turn, sequentially manage a game for the user device of the second user 300 in response to input from the second user 300 in the second user 300's turn, and sequentially output one of the divided multiple plays in the first user 310's turn.

Figure 4:
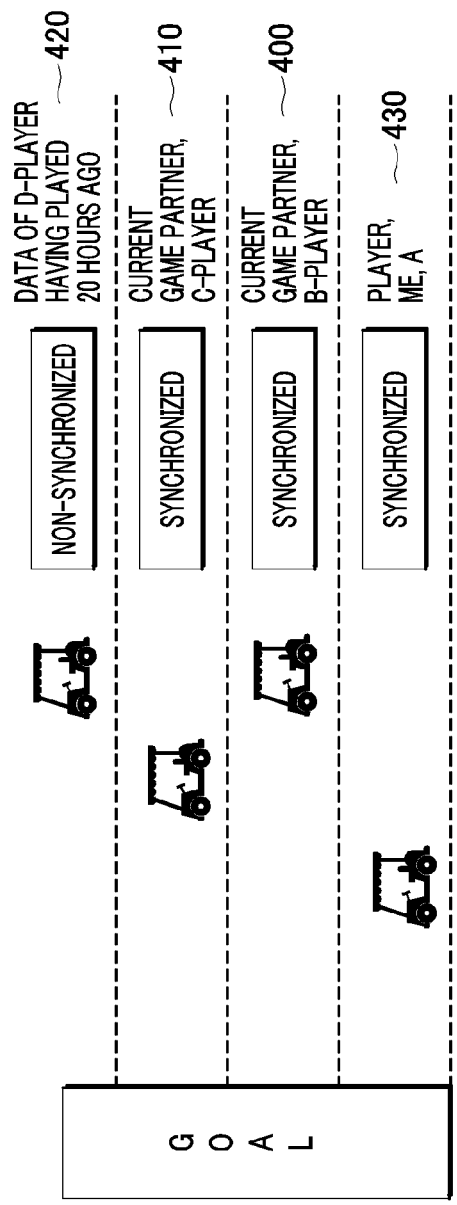
FIG. 4 is a diagram showing an example of a multiplayer-network game in accordance with various embodiments described herein.

FIG. 4 is a diagram showing an example of a multiplayer-network game in accordance with another embodiment of the present disclosure. FIG. 4 illustrates an example of a racing game which is one of simultaneous games.

The user device 100 may be connected with a user device (one of second user devices) of a B-player 400 and a user device (one of second user devices) of a C-player 410. The user device 100 may be connected with the user device of the B-player 400 and the user device of the C-player 410 by the same method as described above with reference to FIG. 1 to FIG. 3.

For example, in a first example, the user device 100, the user device of the B-player 400, and the user device of the C-player 410 may be connected with one another through the Peer-To-Peer communication. In this case, at least one of the user device 100, the user device of the B-player 400, and the user device of the C-player 410 may not store information about at least one past play of a first user device. Further, information about at least one past play of the first user device stored in each of the user device 100, the user device of the B-player 400, and the user device of the C-player 410 may be different from each other. In this case, the information about the at least one past play of the first user device stored in each of the user device 100, the user device of the B-player 400, and the user device of the C-player 410 may be made identical to each other through the Peer-To-Peer communication.

In a second example, the user device 100 may be connected with the user device of the B-player 400 through the Peer-To-Peer communication and the user device of the B-player 400 may be connected with the user device of the C-player 410 through the Server-Client communication. In this case, the user device 100 may not access the Internet.

In this case, the user device 100 may play a game with the user device of the B-player 400 and the user device of the D-player 420 which is a first user device, and the user device of the B-player 400 may play a game with the user device 100, the user device of the C-player 410, and the user device of the D-player 420, and the user device of the C-player 410 may play a game with the user device of the B-player 400 and the user device of the D-player 420.

In a third example, all of the user device 100, the user device of the B-player 400, and the user device of the C-player 410 may be connected to one another through the Server-Client communication. In this case, the user device 100, the user device of the B-player 400, and the user device of the C-player 410 may play a game with an A-player 430, the B-player 400, the C-player 410, and the D-player 420. A game play method is the same as described above with reference to FIG. 1 to FIG. 3.

FIG. 5 is a flowchart showing a method for playing a multiplayer-network game in accordance with an embodiment of the present disclosure. A method for providing a multiplayer-network game according to the embodiment illustrated in FIG. 5 includes the processes time-sequentially performed by the system illustrated in FIG. 1. Therefore, descriptions of the processes performed by the system illustrated in FIG. 1 may be applied to the method for providing a multiplayer-network game according to the embodiment illustrated in FIG. 5, even though they are omitted hereinafter.

In S500, the user device 100 may receive information about at least one past play of a first user device from the game providing server 110.

In S510, the user device 100 may be connected with at least one second user device.

In S520, the user device 100 may play a game between the user device 100 and the second user device in a state of synchronization with the at least one past play of the first user device.

The method for playing a multiplayer-network game described through FIG. 5 can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage medium includes all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A method for playing a multiplayer-network game performed by a user device, comprising:
    receiving, by the user device, information about at least one past play of at least one first user device from a game providing server;
    measuring a communication quality of the user device;
    determining a ratio of a number of the at least one first user device to a number of at least one second user device based on the measured communication quality;
    measuring a distance from the at least one second user device;
    connecting the user device with the at least one second user device based on the determined ratio; and
    playing a game through an asynchronous communication between the user device and the at least one past play of the at least one first user device and a synchronous communication between the user device and the at least one second user device,
    wherein the determining includes:
    when the measured communication quality is equal to or smaller than a preset value, increasing the number of the at least one first user device and decreasing the number of the at least one second user device, and
    when the measured communication quality is greater than the preset value, decreasing the number of the at least one first user device and increasing the number of the at least one second user device,
    wherein the connecting includes:
    when the distance between the user device and the at least one second user device is equal to or greater than a preset distance, connecting the at least one second user device with the user device through Server-Client communication; or
    when the distance between the user device and the at least one second user device is smaller than the preset distance, connecting the at least one second user device with the user device through Peer-To-Peer communication, and
    wherein the connecting further includes:
    when the distance between the user device and the at least one second user device is smaller than the preset distance, automatically determining an application availability in the at least one second user device and preferentially connecting with the at least one second user device present within the preset distance from the user device.

2. The method of claim 1,
    wherein the receiving includes: disconnecting the at least one first user device from the game providing server.

3. The method of claim 1,
    wherein the connecting is performed through Server-Client communication if the user device and the at least one second user device satisfy a first condition, or through Peer-To-Peer communication if the user device and the at least one second user device satisfy a second condition.

4. The method of claim 1, further comprising:
    determining a kind of the user device,
    wherein the determining is performed based on the determined kind of the user device.

5. The method of claim 3,
    wherein the at least one second user device includes a user device connected through the Server-Client communication or a user device connected through the Peer-To-Peer communication.

6. The method of claim 3,
    wherein, if the connecting is performed through the Peer-To-Peer communication, the connecting includes: allowing the user device to transmit the information about the at least one past play of the at least one first user device to the at least one second user device through the Peer-To-Peer communication.

7. The method of claim 1,
    wherein the playing of the game includes:
    playing a game for the user device in response to input from a user;
    playing a game for the at least one second user device in response to input from the at least one second user device; and
    outputting the at least one past play of the at least one first user device.

8. A user device that plays a multiplayer-network game, comprising:
    a game information receiving unit configured to receive information about at least one past play of at least one first user device from a game providing server;
    a communication quality measurement unit configured to measure a communication quality of the user device;
    a communication unit configured to connect the user device with at least one second user device; and
    a game execution unit configured to play a game through an asynchronous communication between the user device and the at least one past play of the at least one first user device and a synchronous communication between the user device and the at least one second user device,
    wherein the game execution unit includes a user determination unit configured to determine a ratio of a number of the at least one first user device to a number of the at least one second user device based on the measured communication quality,
    wherein the communication unit is configured to connect the user device with the at least one second user device based on the determined ratio,
    wherein the user determination unit is configured to increase the number of the at least one first user device and decrease the number of the at least one second user device when the measured communication quality is equal to or smaller than a preset value, wherein the user determination unit is configured to decrease the number of the at least one first user device and increase the number of the at least one second user device when the measured communication quality is greater than the preset value, wherein the communication quality measurement unit is further configured to measure a distance from the at least one second user device, wherein the user determination unit is further configured to connect the at least one second user device with the user device through Server-Client communication, when the distance between the user device and the at least one second user device is equal to or greater than a preset distance, or configured to connect the at least one second user device with the user device through Peer-To-Peer communication when the distance between the user device and the at least one second user device is smaller than the preset distance, and wherein the user determination unit is further configured to automatically determine an application availability in the at least one second user device and preferentially connect with the at least one second user device present within the preset distance from the user device when the distance between the user device and the at least one second user device is smaller than the preset distance.

9. The user device of claim 8, wherein the communication unit is configured to connect the at least one second user device with the user device through Server-Client communication if the user device and the at least one second user device satisfy a first condition, or through Peer-To-Peer communication if the user device and the at least one second user device satisfy a second condition.

10. The user device of claim 9, wherein the communication unit is configured to allow the user device to transmit the information about the at least one past play of the at least one first user device to the at least one second user device through the Peer-To-Peer communication.

11. The user device of claim 8, wherein the game execution unit is configured to play a game for the user device in response to input from a user, play a game for the at least one second user device in response to input from the at least one second user device, and output the at least one past play of the at least one first user device.

* * * * *